(12) United States Patent
Ho et al.

(10) Patent No.: US 11,144,727 B2
(45) Date of Patent: Oct. 12, 2021

(54) EVALUATION FRAMEWORK FOR INTENT AUTHORING PROCESSES

(71) Applicant: INTERNATIONAL BUSINESS MACHINES CORPORATION, Armonk, NY (US)

(72) Inventors: Tin Kam Ho, Millburn, NJ (US); Abhishek Shah, Jersey City, NJ (US); Neil Mallinar, Long Island City, NY (US); Rajendra G. Ugrani, Union City, NJ (US); Ayush Gupta, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 325 days.

(21) Appl. No.: 16/417,444

(22) Filed: May 20, 2019

(65) Prior Publication Data
US 2020/0372111 A1 Nov. 26, 2020

(51) Int. Cl.
*G06F 40/30* (2020.01)
*G06F 16/61* (2019.01)
(Continued)

(52) U.S. Cl.
CPC .......... *G06F 40/30* (2020.01); *G06F 16/3329* (2019.01); *G06F 16/61* (2019.01);
(Continued)

(58) Field of Classification Search
CPC .......... G06N 20/00; G06N 3/08; G06N 3/006; G06N 3/088; G06N 3/004; G06N 3/02;
(Continued)

(56) References Cited

U.S. PATENT DOCUMENTS 8,069,042 B2   10/2011   Joublin et al.
8,515,736 B1 * 8/2013   Duta .................. H04M 3/5232
                                                          704/9
(Continued)

FOREIGN PATENT DOCUMENTS

WO    2017156640 A1   9/2017

OTHER PUBLICATIONS

Anuj Goyal, Angeliki Metallinou, Spyros Matsoukas, Fast and Scalable Expansion of Natural Language Understanding Functionality for Intelligent Agents, https://www.aclweb.org/anthology/N18-3018/, pp. 145-152 (Year: 2018).*

(Continued)

*Primary Examiner* — Linda Wong
(74) *Attorney, Agent, or Firm* — Griffiths & Seaton PLLC

(57) ABSTRACT

Evaluating intent authoring processes, by a processor in a computing environment. A dataset comprising utterances of interactive dialog sessions between agents and clients for a given product or service is received. A classification of at least a portion of the utterances is performed for a target intent according to at least one of a plurality of recommendation algorithms, where the classification is performed by an automatic driver invoking the recommendation algorithm and simulating a manual confirmation of the algorithm's decision by a user. A classifier trained with the utterances recommended and confirmed by the automatic driver is automatically evaluated according to at least one of the plurality of evaluation criteria. A report tracking the evaluation results is generated.

21 Claims, 9 Drawing Sheets

(51) Int. Cl.
  *G10L 15/08* (2006.01)
  *G06F 16/332* (2019.01)
  *G10L 19/04* (2013.01)

(52) U.S. Cl.
  CPC ............ *G10L 15/08* (2013.01); *G10L 15/083* (2013.01); *G10L 19/04* (2013.01)

(58) Field of Classification Search
  CPC ...... G06F 40/30; G06F 40/35; G06F 16/3329; G06F 40/56; G06F 9/451; G06F 16/90332; G06F 16/3344; G06F 16/35; G06F 16/338; G06F 40/20; G06F 40/279; G06F 11/3466; G06F 16/285; G06F 16/316; G06F 16/33; G06F 16/355; G06F 16/9038; G06F 16/906; G06F 16/9538; G06F 17/18; G06F 2216/03; G06F 40/268; G10L 15/22; G10L 2015/223; G10L 15/26; G10L 15/1822; G10L 15/063; G10L 15/1815; G10L 15/16; G10L 2015/221; G10L 13/00; G10L 15/08; G10L 15/00; G10L 15/005; G10L 15/06; G10L 15/07; G10L 15/183; G10L 15/20; G10L 17/26; G10L 25/72; H04L 67/22; H04L 51/16; H04L 51/18; H04L 51/10; H04L 51/32; H04L 67/14; H04L 51/04; H04L 63/1425; G06K 9/6267; G06K 9/6262; G06K 9/6218; G06K 9/6227; G06K 9/628; G06K 9/726; G06K 9/00288; G06K 9/6264; G06K 9/6296; G06K 9/6298; G06Q 50/01; G06Q 10/10
  See application file for complete search history.

(56) References Cited

U.S. PATENT DOCUMENTS

| | | | |
|---|---|---|---|
| 8,554,715 | B2 | 10/2013 | Wessel et al. |
| 8,571,869 | B2 | 10/2013 | Deligne et al. |
| 9,292,262 | B2 | 3/2016 | Gabel et al. |
| 9,436,759 | B2 | 9/2016 | Huang et al. |
| 9,589,564 | B2 | 3/2017 | Sharifi |
| 9,842,000 | B2 | 12/2017 | Bishop et al. |
| 10,789,943 | B1* | 9/2020 | Lapshina .............. G06F 40/205 |
| 2003/0200172 | A1 | 10/2003 | Randle et al. |
| 2010/0306249 | A1 | 12/2010 | Hill et al. |
| 2015/0221305 | A1 | 8/2015 | Sharifi |
| 2015/0279360 | A1 | 10/2015 | Mengibar et al. |
| 2016/0055240 | A1 | 2/2016 | Tur et al. |
| 2017/0242886 | A1 | 2/2017 | Jolley et al. |
| 2017/0235740 | A1* | 8/2017 | Seth ........................ H04L 67/10 707/738 |
| 2017/0278514 | A1 | 9/2017 | Mathias et al. |
| 2017/0330077 | A1 | 11/2017 | Williams et al. |
| 2018/0053119 | A1 | 2/2018 | Zeng et al. |
| 2018/0068019 | A1 | 3/2018 | Novikoff et al. |
| 2018/0096058 | A1 | 4/2018 | Anderson et al. |
| 2018/0137401 | A1 | 5/2018 | Kumar et al. |
| 2018/0358001 | A1* | 12/2018 | Amid ...................... G06N 20/00 |
| 2019/0051290 | A1 | 2/2019 | Li et al. |
| 2019/0166069 | A1* | 5/2019 | Yao ....................... G06F 3/0486 |
| 2019/0286712 | A1* | 9/2019 | Terry ...................... G06F 40/30 |
| 2020/0007380 | A1* | 1/2020 | Chen ..................... H04L 41/046 |
| 2020/0065384 | A1* | 2/2020 | Costello ............... G06N 3/0454 |
| 2020/0167417 | A1* | 5/2020 | Li .......................... G06F 16/367 |
| 2020/0202256 | A1* | 6/2020 | Chaudhari ........... G06K 9/6218 |
| 2020/0236068 | A1* | 7/2020 | TeNyenhuis ........... G06N 20/00 |
| 2020/0242305 | A1* | 7/2020 | Wu ........................... G06N 5/04 |
| 2020/0250277 | A1* | 8/2020 | Mallette .................. G06F 40/30 |
| 2020/0251100 | A1* | 8/2020 | Tan ................... G06F 16/90332 |
| 2020/0335097 | A1* | 10/2020 | Seol ........................ G06N 3/006 |
| 2020/0349919 | A1* | 11/2020 | Wanas .................. G10L 15/063 |

OTHER PUBLICATIONS

Ratner Alexander, De Sa Christopher, Wu Sen, Selsam Daniel, Re Christopher, Data Programming: Creating Large Training Sets, Quickly, https://dawn.cs.stanford.edu/pubs/snorkel-nips2016.pdf, pp. 1-9 (Year: 2016).*

"Complexity Measures of Supervised Classification Problems", Tin Kam Ho, Member, IEEE, and Mitra Basu, Senior Member, IEEE Transactions of Pattern Analysis and Machine Intelligence, vol. 24, No. 3, Mar. 2002 (12 Pages).

Anuj Goyal, Angeliki Metallinou, Spyros Matsoukas, Fast and Scalable Expansion of Natural Language Understanding Functionality for Intelligent Agents, Proceedings of NAACL-HLT 2018, pp. 145-152.

Lexander Ratner, Christopher De Sa, Sen Wu, Daniel Selsam, Christopher Re, Date Programming:Creating Large Training Sets, Quickly, NIPS 2016.

List of IBM Patents or Patent Applications Treated as Related (2 Pages).

"Iterative app design for LUIS" https://docs.microsoft.com/en-us/azure/cognitive-services/luis/luis-concept-app-iteration Jul. 6, 2020 (7 Pages).

"Rapidly scaling dialog systems with interactive learning" Williams, Niraula, Dasigi, et al. Work done while at Microsoft Research (12 Pages).

"Bootstrapping Conversational Agents With Weak Supervision", Neil Mallinar et al. IBM Watson, New York, NY 10003, USA ( 6 Pages).

"Complexity Measures of Supervised Classification Problems", Tin Kam Ho, Member, IEEE, and Mitra Basu, Senior Member, IEEE Transactions on Pattern Analysis and Machine Intelligence, vol. 24, No. 3, Mar. 2002 ( 12 Pages ).

* cited by examiner

EVALUATION FRAMEWORK FOR INTENT AUTHORING PROCESSES

BACKGROUND OF THE INVENTION

Field of the Invention

The present invention relates in general to computing systems, and more particularly, to various embodiments for evaluating intent authoring processes used in training automated response systems.

Description of the Related Art

Customer contact center systems provide support for customers of a particular product or service by allowing those users to make requests for service that can include a question posed by the user related to the product or service. Generally speaking, these systems receive requests for service in various forms (e.g., in the form of a phone call, web page form, instant message, email, etc.), and route the requests to either a virtual agent or live, human agent for addressing the request and providing an answer to the question. For example, a chat or other interactive session can be conducted between the customer or client and an automated virtual agent which guides the interaction based on a set of scripts and a knowledgebase related to the topic of the contact. In other cases, a chat session can be initiated between the customer and the live agent who can interact directly with the customer over any one or more of the available channels (e.g., web chat, instant message, email exchange, etc.).

In implementations where automated response systems are used (e.g., using a chatbot), it is imperative to train these systems with intent data such that the system provides semantically accurate responses to clients interacting therewith according to the context of the client's query.

SUMMARY OF THE INVENTION

Various embodiments for evaluating intent authoring processes in a computing environment are provided. In one embodiment, a method comprises receiving a dataset comprising utterances of interactive dialog sessions between agents and clients for a given product or service; performing a classification of at least a portion of the utterances for a target intent according to at least one of a plurality of algorithms; wherein the classification is performed by an automatic driver iteratively invoking an algorithm and then simulating a manual confirmation of the algorithm's decisions by a user; automatically evaluating the classification of the utterances made by the automatic driver according to the at least one of the plurality of algorithms; and generating a report tracking the evaluated classification for each of the at least one of the plurality of algorithms.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
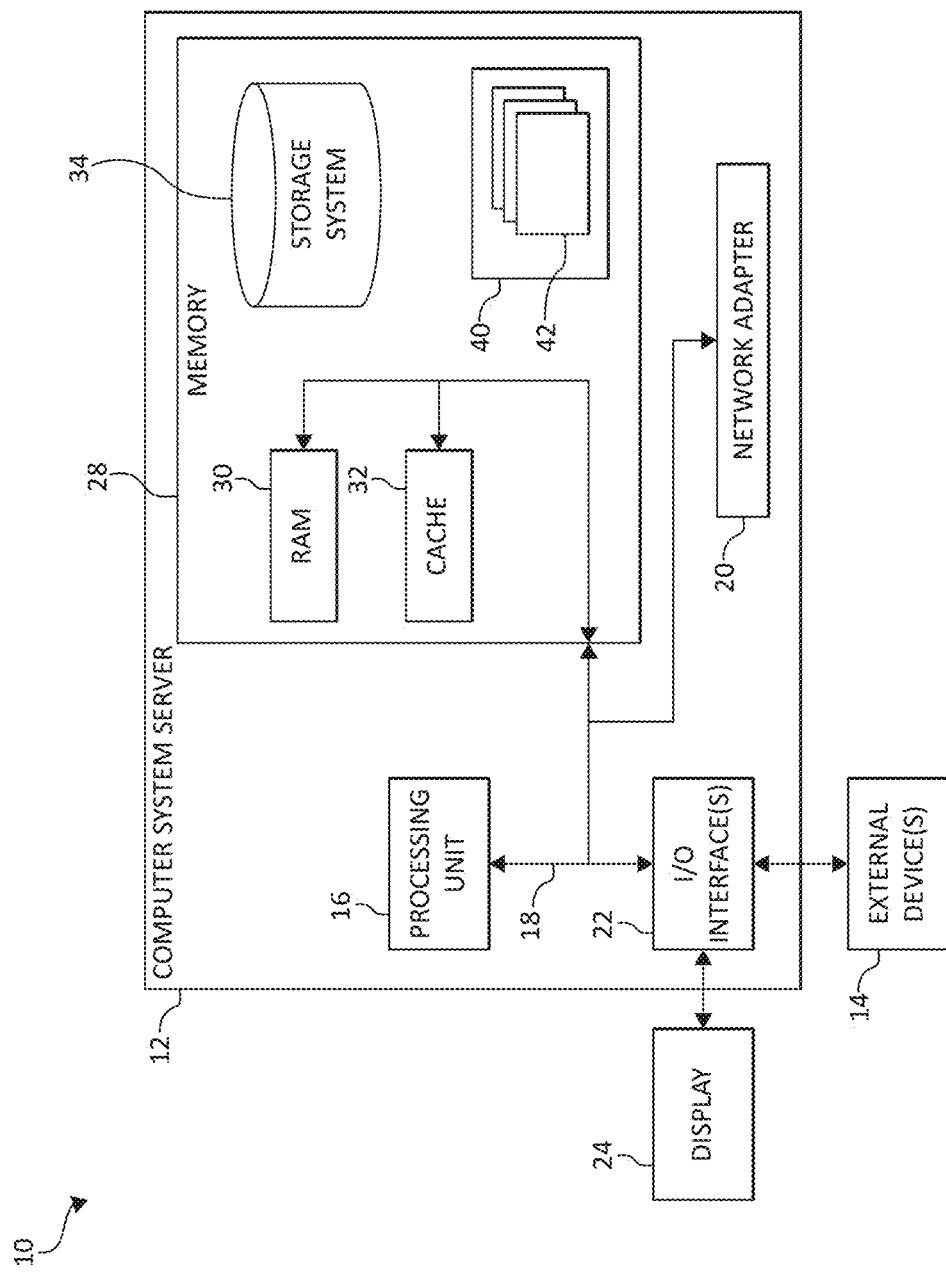
FIG. 1 is a block diagram depicting an exemplary computing node, according to embodiments of the present invention.

As previously mentioned, in contemporary customer contact centers, the systems therein provide support for customers of a particular product or service by allowing those users to make requests for service that can include a question posed by the user related to the product or service. In some cases, a chat session can be initiated between the customer or client and a live agent (e.g., a human operator) or a virtual agent (e.g., a chatbot operated by a computing system) who can interact directly with the customer over any one or more available channels (e.g., web chat, instant message, email exchange, etc.). In implementations which rely on virtual agents, often times a substantial obstacle to overcome when interacting with human customers or clients is ascertaining by the virtual agent what the underlying intent is of a query or statement posed by human customer or client.

Inherently, humans ask questions or utter statements in different semantic variances notwithstanding the intent of the question or statement in selected cases are similar. An intent in a conversational model is a concept that represents a set of semantically similar sentences for which the same response is suitable in a dialog. For example, utterances like "good morning", "hello", and "hi" are all used for the intent of a greeting. Discernment of intents may become more difficult, however, depending on the complexity of the utterance used. In a more complex example, one client may pose the question "How can I reset my internet account", while another may state "I need to reset my internet password". These questions/statements, each of which the intent would be fairly easily understood to be more or less equivalent by a human operator, may trigger a variety of responses from virtual agents. In one scenario, the virtual agent may interpret the "resetting the internet account" question as a query regarding the resetting of the client's internet service in general (e.g., resetting a modem or router associated with their account), where the client's actual intent was the same as the other client requesting a password reset to get into their internet (billing/email) account. A vast variety of examples exist like these in which virtual agents must be trained to offer accurate results to the client when provided with utterances of such variety.

Modern chat systems recognize this limitation and attempt to create intent models by recognizing statistical classifiers trained with sample utterances. Users/administrators (i.e., clients, customers, or otherwise human operators) often create intents by collecting and annotating many sentences with their respective intents, which is a labor-intensive process. In some cases, users may review and annotate hundreds if not thousands of sample utterances while still not achieving a very high intent success rate when populated into an intent classifier that supports a live dialog. However, the high cost involved often means that the user can afford to annotate only small example sets of utterances, resulting in further sub-optimal intent recognition performance in live dialog situations.

In some implementations, various tools may be provided to users to ease the amount of labor necessitated in this intent authoring process. For example, users who need to author (define) intents for a conversation service can use tools to bootstrap an intent definition. One such tool leverages existing human-to-human chat logs and enables the client to find utterance examples from the logs that are relevant to the intent. In the process, once the client starts with one or more example utterances believed to be relevant to the intent, the tool can match the examples with utterances in the chat logs and produce recommendations. The tool provides the user a way to select examples from the pool of recommendations to add to the intent, and this process can repeat iteratively as the user adds examples from the recommendations such that the matching restarts from the accumulated set.

Many different methods could potentially be useful for generating these recommendations. To determine which method is best suited for deployment, an evaluation mechanism is needed that can follow the iterative recommendation and selection process. However, this evaluation process involves human judgment. If a domain expert is required to work with each possible option of the recommendation algorithm to determine its merits, it would be prohibitively time and resource expensive. Ideally, the evaluation mechanism is automated so that the process can self-optimize (i.e., using iterations of synthetically generated inputs designed to simulate those of a human operator), and the evaluation for confirming merits can be included in a continuously advancing recommendation deployment process.

Prior attempts for evaluating recommendation algorithms, such as simple evaluation methods for sentence/text matching algorithms, are limited in providing insight into a recommendation algorithm if they are applied in only one pass. These methods may provide some knowledge regarding the relative merits of particular algorithms for a fixed scenario; however, machine learning algorithm performances are often data dependent, and the data context changes during an intent bootstrapping process. Moreover, known systems that support dynamic authoring processes require true human input to evaluate. An evaluation method that can follow the process with continuous input from a real/simulated user (i.e., a system which does not require a human operator to interact with the intent authoring system) is therefore preferred.

Accordingly, the functionality of the present invention proposes techniques for substantially increasing and tracking the accuracy used by particular algorithms employed to support intent authoring for automated response services. In some embodiments, an evaluation and regression test mechanism is disclosed which provides an understanding of the quality of utterance sample recommendations made to a domain expert as the domain expert builds up training examples for an intent using an iterative expansion and confirmation process. The mechanism consists of an automatic driver that represents the tooling or interface that the user interacts with, which itself interfaces to components of a content authoring system. The content authoring system may include a number of microservices that represent the recommendation algorithms, a search engine, a state-tracking database manager, and an evaluator of the gathered training data for an intent. Given a collection of example utterances (e.g., received from chat logs) having already been labeled with their true intents, the mechanism uses such ground truth to simulate a domain expert's labeling effort within a limit of tolerance (e.g. an upper bound of the number of sentence samples to review), and automatically proceeds with iterations of example expansion and confirmation until no further examples can be confirmed. The evaluator then generates figures of merits, diagnostic reports and plots that can be used to track the performance of the recommendation algorithms.

The proposed evaluation system further provides an understanding as to how different utterance selections can assist training the intent classifier. Over time, more optimized methods that recommend better examples may be developed by examining the expansion trajectories supported by different algorithms, as compared to one another. Simulation of the iterative recommend/review process allows measurements of dynamical merits such as convergence rate, time spent by a user to reach each a given level of accuracy or diversity, etc. These can help fine tune the recommendation algorithms and set expectations with the clients employing the classifier(s). Finally, the evaluation mechanism automates the continuous integration and deployment process. Once the recommendation algorithm is selected or updated, evaluation can be launched to check whether pre-defined figures of merits are satisfied, and integration and deployment to production may then proceed if the resultant output passes predefined criterion.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 (or memory subsystem 28) can include computer system readable media in the form of volatile memory, such as random access memory (RAM) 30 and/or cache memory 32. Cache memory 32 may comprise, for example, a shared cache (such as an L2 cache) which is shared among multiple cores of the processor 16 and/or may comprise a private cache (such as an L1 cache). Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
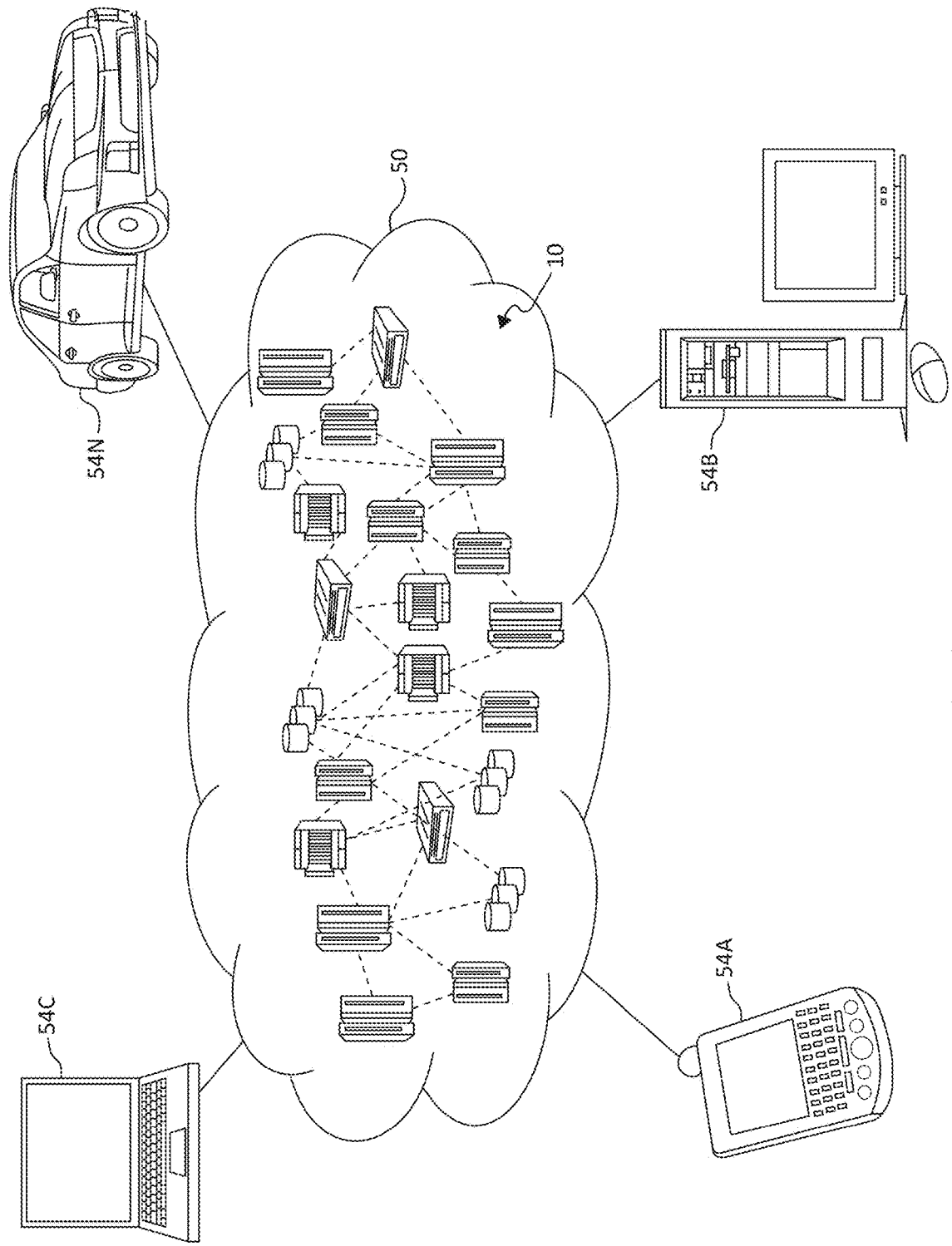
FIG. 2 is an additional block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
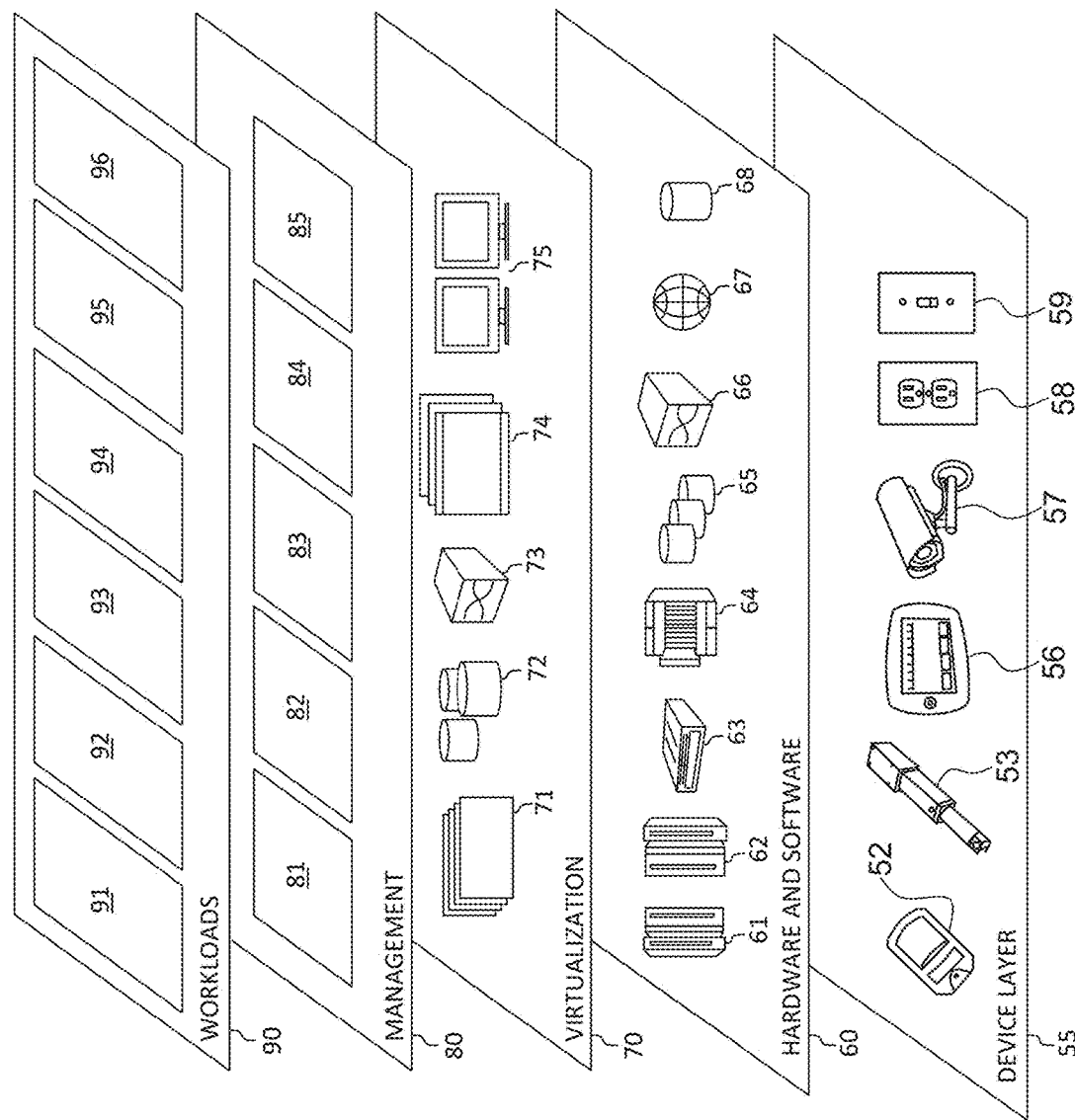
FIG. 3 is an additional block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various conversational and dialog analyzing functions 96. One of ordinary skill in the art will appreciate that the conversational and dialog analyzing functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
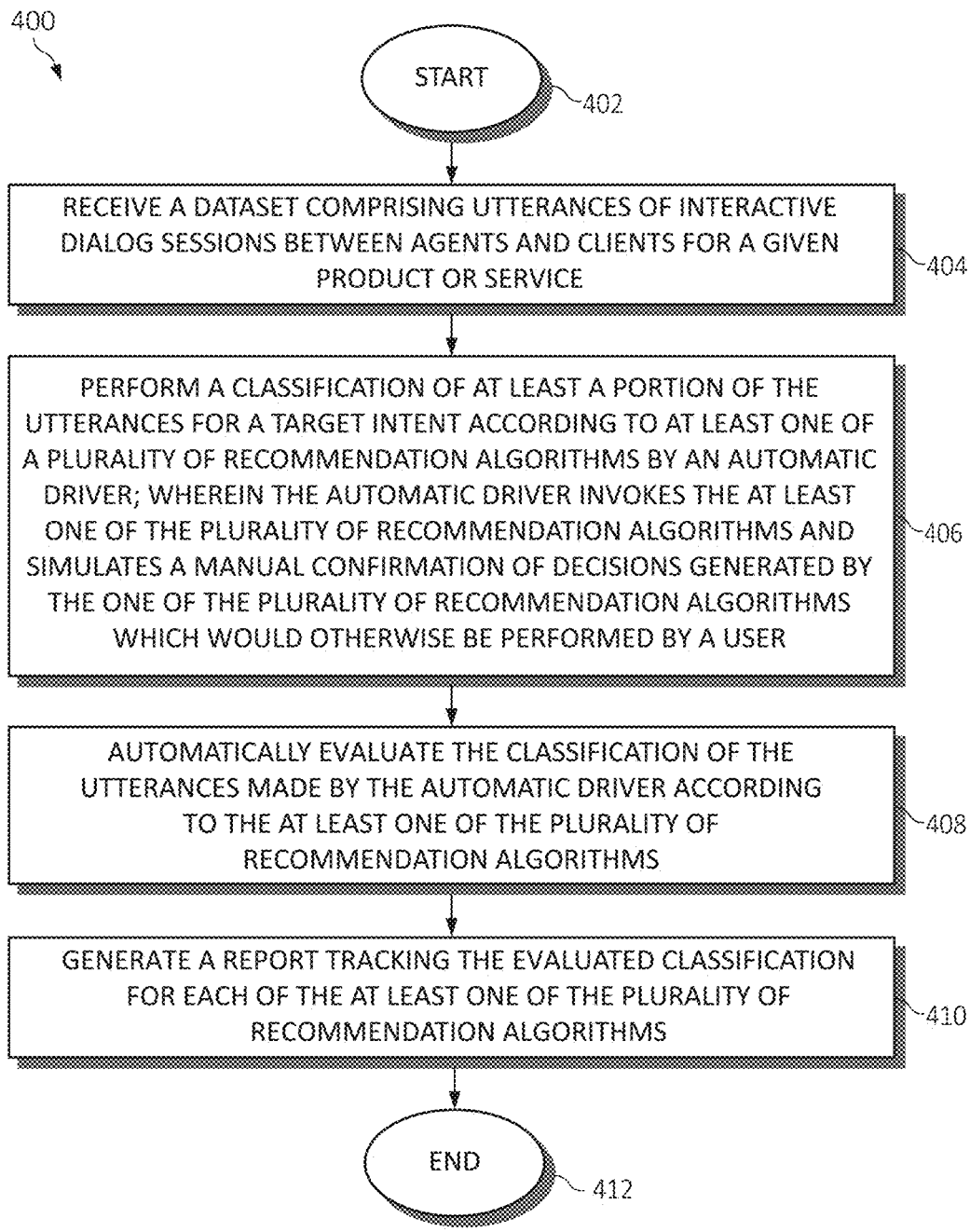
FIG. 4 is a flow chart diagram depicting a method for evaluating intent authoring processes, according to embodiments of the present invention.

Turning now to FIG. 4, a method 400 for evaluating intent authoring processes by a processor is depicted, in which various aspects of the illustrated embodiments may be implemented. The functionality of the method 400 may be executed as instructions on a machine, where the instructions are embodied on a tangible, non-transitory machine-readable storage medium. The method 400 begins at step 402. In some embodiments, a dataset comprising utterances of interactive dialog sessions between agents and clients for a given product or service is received (step 404). A classification of at least a portion of the utterances is performed for a target intent according to at least one of a plurality of algorithms, where the classification is performed by an automatic driver invoking an algorithm and then simulating a manual confirmation of the algorithm's decision by a user (step 406). The classification of the utterances made by the automatic driver is automatically evaluated according to the at least one of the plurality of algorithms (step 408). Subsequent to the evaluation, a report tracking the evaluated classification for each of the at least one of the plurality of algorithms is generated (step 410). The method 400 ends (step 412).

In accordance with aspects of the present invention, several functional components are considered to have previously been implemented. A first component includes a user interface for a user to ingest an existing conversation corpus (i.e., received from a data repository of previously saved conversational logs), by file upload or online data transfer from a human-operated chat platform. A second component includes a search service for the user to query for utterances in the corpus that are relevant to a given intent. A third component includes a labeling tool (i.e., implemented via a user interface (UI)) for the user to indicate whether each of a selected set of retrieved utterances is in the intent or not. A fourth component finally includes a recommendation and expansion mechanism whereby, according to the selections of the user to the set of retrieved utterances, additional utterances which the system predicts are related to the intent are presented for the user to review and confirm. This propagation technique takes user-labeled examples of a small subset of utterances and determines the best way to extend those labels to neighboring examples predicted to be related to the respective intent being authored.

Figure 5:
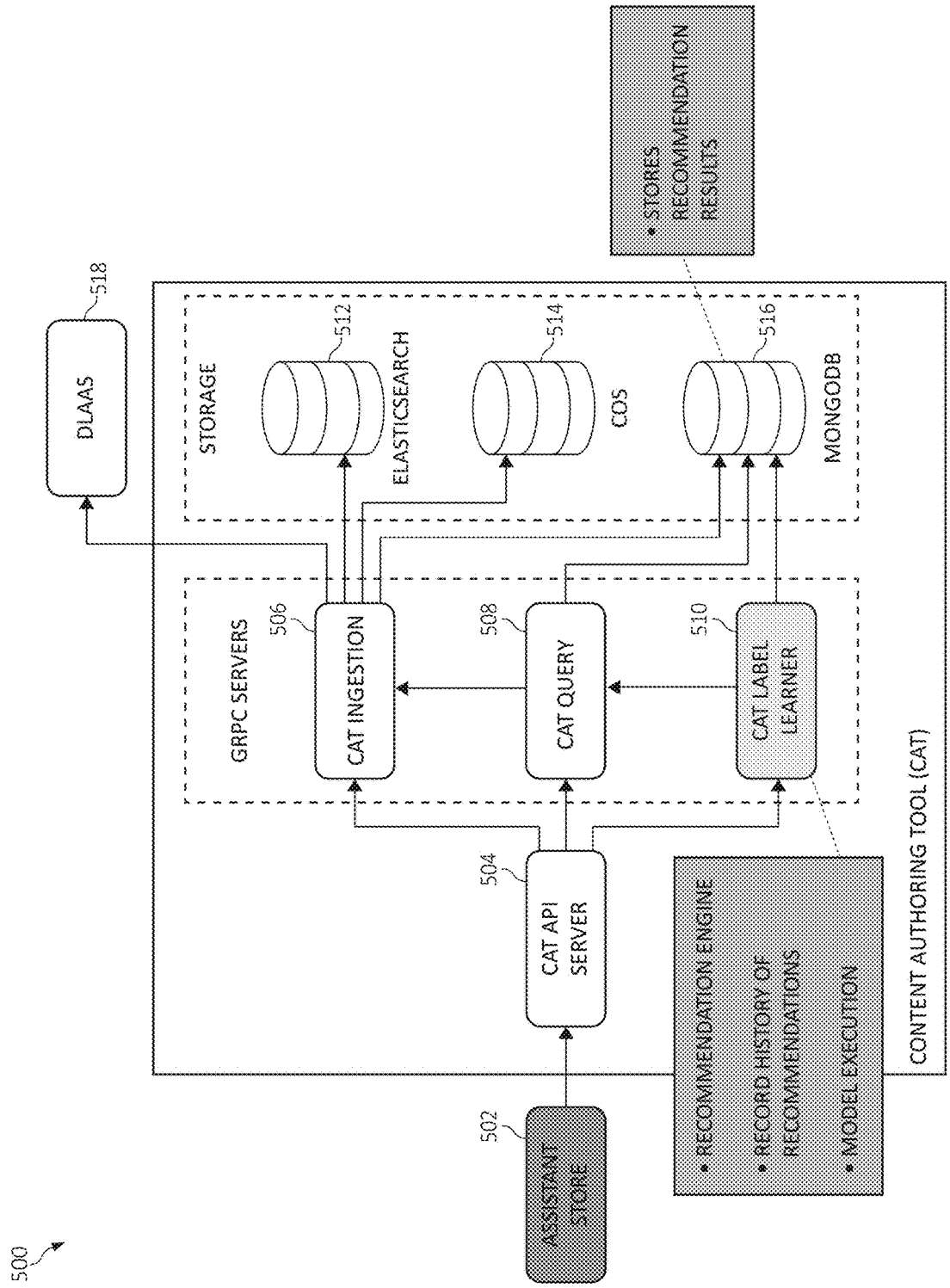
FIG. 5 is a block diagram depicting a system overview of a content authoring tool, according to embodiments of the present invention.

Referring now to FIG. 5 a system overview of a content authoring tool 500 is depicted. As shown, the various functions, or "modules" of functionality, hardware devices, and/or other components in the same descriptive sense as has been previously described in FIGS. 1-3 may be included in FIG. 5. For example, processing unit 16 and memory 28 of FIG. 1 may be employed in FIG. 5 to perform various computational, data processing, storage and other functionality in accordance with various aspects of the present invention.

In an exemplary embodiment, the content authoring tool 500 is implemented within the context of the IBM® Watson® platform and includes an assistant store 502 for receiving user tooling and application programming interface (API) requests into an API/UI application server 504 (which may execute a WebSphere™ Liberty for Java™ profile). The application server 504 may communicate and exchange data regarding the conversational logs with a data ingestion server 506 for receiving and loading the corpus from the repository 504. The user may issue a query to a query server 508 (through an API executing on the application server 504) to return utterances to the user interface having a specific (queried) intent, and the query server 508 may communicate with the data ingestion server 506 using an Elasticsearch search engine 512 to perform the query on an object storage 514 and/or a database 516 (which may comprise a MongoDB™) associated with the stored conversational logs to return the utterances. Upon returning a subset of the conversational logs and labeling a selected set of the utterances therein functioning within the context of the labeling learning server 510, the labeling learning server 510 may pass additional queries to the query server 508 and/or the data ingestion server 506 for further analyzation on the remaining corpus. Additionally illustrated in the content authoring tool 500 are other computational services including Watson services 518 (which may be associated with Deep Learning as a Service (Dlaas)) which communicates with the one or more of the servers (e.g., the ingestion server 506) to assist in batch processing.

The content authoring tool 500 may use a semi-supervised learning process that combines automated learning and manual labeling. As previously mentioned, once one or more utterances are given as examples for an intent, a learning algorithm is trained with those examples to look for additional, similar examples in the chat log. The resultant new examples are then sent to the user (i.e., a human expert) for confirmation. The examples confirmed by the user are then added to the initial collection to retrain the learning algorithm, and the process repeats.

Figure 6A:
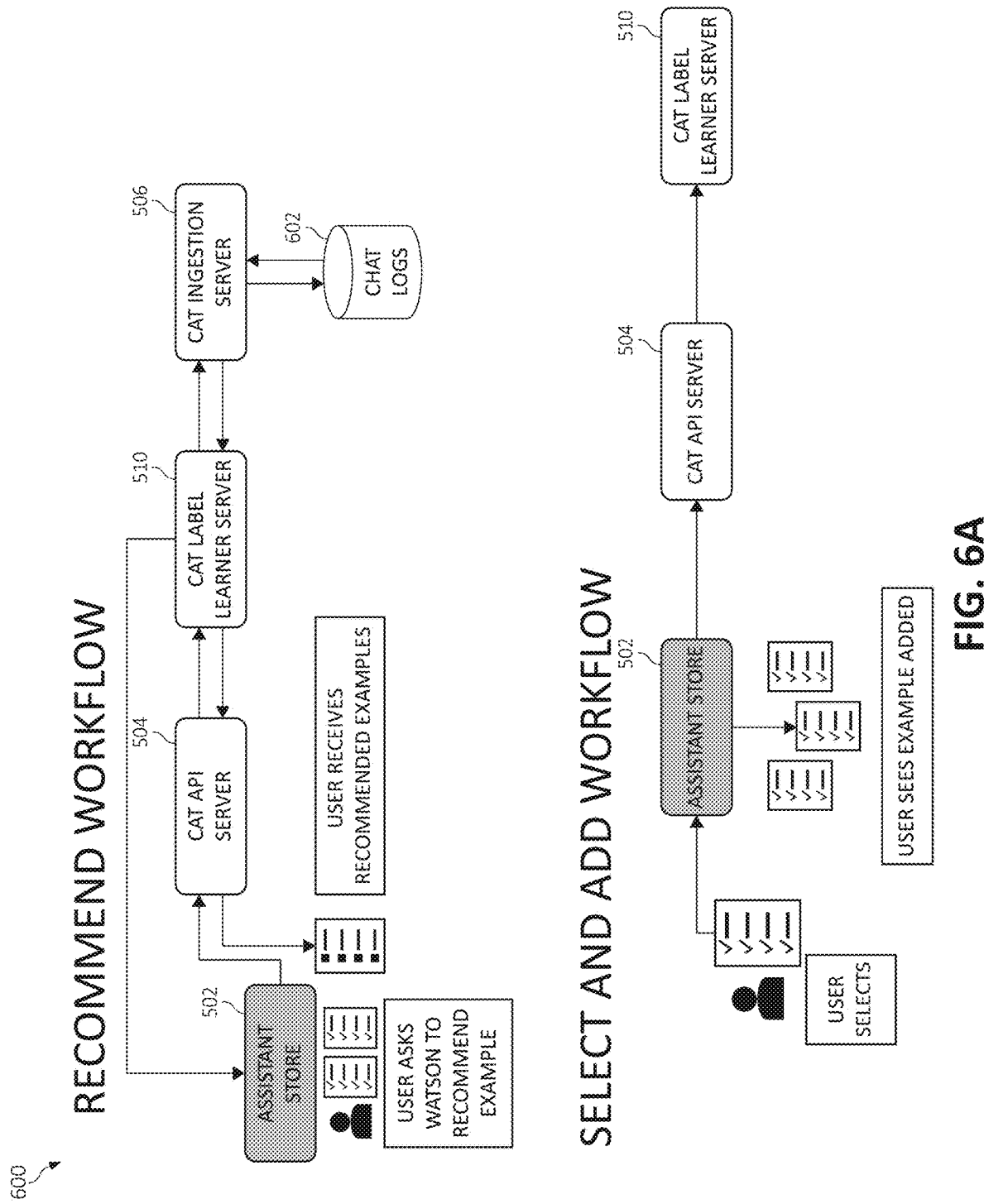
FIGS. 6A and 6B are a block diagrams depicting intent authoring workflows implementing the content authoring tool, according to embodiments of the present invention.

An example of a semi-supervised learning process 600 is depicted in FIG. 6A using the functional components of the content authoring tool 500 described previously. The process 600 includes two workflows: a recommend workflow where utterance examples are recommended to the user, and a select-and-add workflow where those utterance examples are labeled for the current intent. During the recommend workflow, the user queries the system to recommend additional examples related to the (current) target intent. As described in FIG. 5, the user initiates the query through the assistant store 502, which works with the application server 504, labeling learner server 510, and data ingestion server 506 to retrieve example utterances from a corpus (e.g., chat logs 602). One the relevant examples returned by the system have been selected by the user, the select-and-add workflow initiates to add those examples to the target intent. Meanwhile, the system uses feedback from the labeling learner server 510 and the assistant store 502 to iteratively update and optimize future recommended example utterances.

This process should be effective in terms of time and effort required of the user, and thereby reduce time-to-value of the product (i.e., the chat bot). At the same time, the implemented system should suggest example utterances that are engaging enough (i.e., novel and relevant to the intent) to keep the user away from boredom. There are many alternative designs of the recommendation algorithm that can serve this purpose (i.e., different recommendation algorithms and parameter settings thereof may be implemented which suggest correspondingly different examples). To understand the relative merits of each, the algorithm needs to be built into the authoring process and evaluated together with the human judgment on the correctness of the recommended examples.

To determine the effectiveness of such an authoring process, under different choices of expansion algorithms and parameter settings (and for a large variety of data and intent definitions), the evaluation of each algorithm needs to be performed automatically without querying for human input for each data context and algorithm setting. The present invention proposes such an architecture with design implementation assumptions as follows. First, the intent authoring system should be evaluated on the following factors: 1) The user is able to find useful example recommendations from the data source (e.g. the chat logs) that are relevant enough to the intent to stay engaged in the process. 2) The user is able to find the useful examples by looking at only a small number of recommendations coming from the system so as to reduce time and effort expended during the process. 3) After accepting the useful recommendations, the user is able to build an intent classifier (utilizing a given algorithm) with the expanded examples that achieves a better accuracy.

Moreover, the following assumptions are made while designing the evaluation mechanism for the system: 1) The user works on authoring one intent at a time. 2) The user begins with at least one example utterance belonging to the intent which is referred to as a "seed set", based on which recommendations from the chat logs are produced (the user may compose the example or search the chat log to find such examples). 3) Many recommendations are able to be found to match a given seed set, and these examples can be prioritized in a rank order and presented to the user in pages, each containing a small batch. The user interface is designed in a way so as to present a fixed number of recommendations per page, K. Thus, to show N recommendations, N/K pages are presented for the user to review. 4) The user looks for suitable recommendations starting from first page, and continues on the following pages until the user finds useful examples. As soon as the user finds at least one relevant example in a reviewed page, the user finishes reviewing the current page however does not review the following pages; instead, a new first page from the next round of recommendations is presented. Finally, 5) The user has a limit on affordable effort to review examples; so if the user does not find any relevant example after reviewing M pages from a round of recommendations, the user quits the authoring process.

In order to compare different recommendation algorithms on the same data, the present invention proposes using a synthesized dataset that contains a large number of utterances having already (previously) been labeled with the target intents. A small subset of the utterances is chosen to represent the seed set examples for each intent, and the remaining utterances are used to represent a client chat log 602. Optionally, another subset is withheld to test the resultant intent classifier. The true labels of the utterances, however, are not used or known by the recommendation algorithm. Instead, these labels are used to simulate a user's selection of the recommended utterances using an automatic driver and to evaluate the accuracy of the resultant classifier.

Figure 6B:
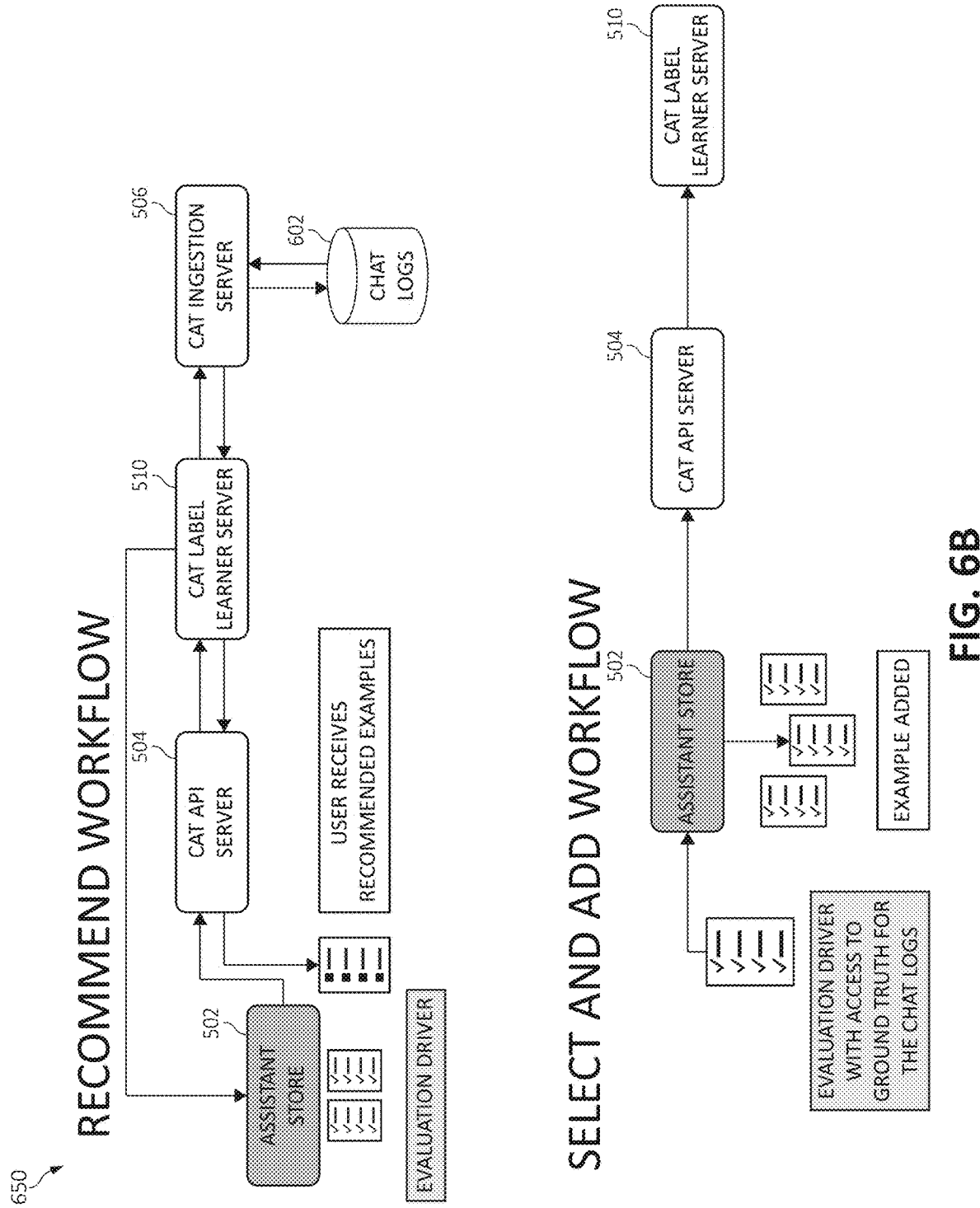

In the proposed framework, the automatic driver plays both the roles of the user and the tooling the user uses to interface with the recommender, as depicted in the process 650 of FIG. 6B. Similar to the manual semi-supervised learning process of FIG. 6A, the driver first receives a corpus of chat logs 602 from which the user believes example utterances for their intents can be drawn. The driver then simulates the client's starting scenario with a first seed set of utterances added to the target intent, and initiates a call for recommendations. On receiving each recommendation call, the recommender takes the existing examples in the intent and matches them with relevant utterances from the chat log 602, and return them to the user for review. Then, the driver simulates the client's labeling effort by comparing the known ground truth (i.e., of the previously labeled intents) of the recommended utterances to the target intent. An utterance is thus accepted into the intent if its true label matches the target intent being built.

That is, in the process 650 depicted in FIG. 6B, the same course of action is taken in the process 650 as was taken in the process 600 of FIG. 6A, with the exception that the user is simulated by the automatic driver (i.e., the user does not perform the workflow). Rather, given an initial seed set for a target intent, the automatic ("evaluation") driver simulates the user performing the actions of receiving additional recommended example utterances and labeling them accordingly. Because the intent of the expanded example utterances recommended to the automatic driver is already known (because the chat logs 602 have been previously labeled), a testing (on multiple factors) of the algorithm used to select those examples from the chat logs 602 is then able to be performed by comparing which examples the automatic driver selects to be included into the target intent according to which example utterances are recommended to the automatic driver. Subsequently, the resulting classifier trained with the input utilizing two or more algorithms (e.g., single sentence expansion (SSE) vs. SSE+weak learning (WL)) may be compared to determine which algorithm provided the most accurate results. In some implementations, for example, the entire input corpus may be divided into halves with each half being used as a test set for a classifier trained under a given algorithm by this process.

Figure 7:
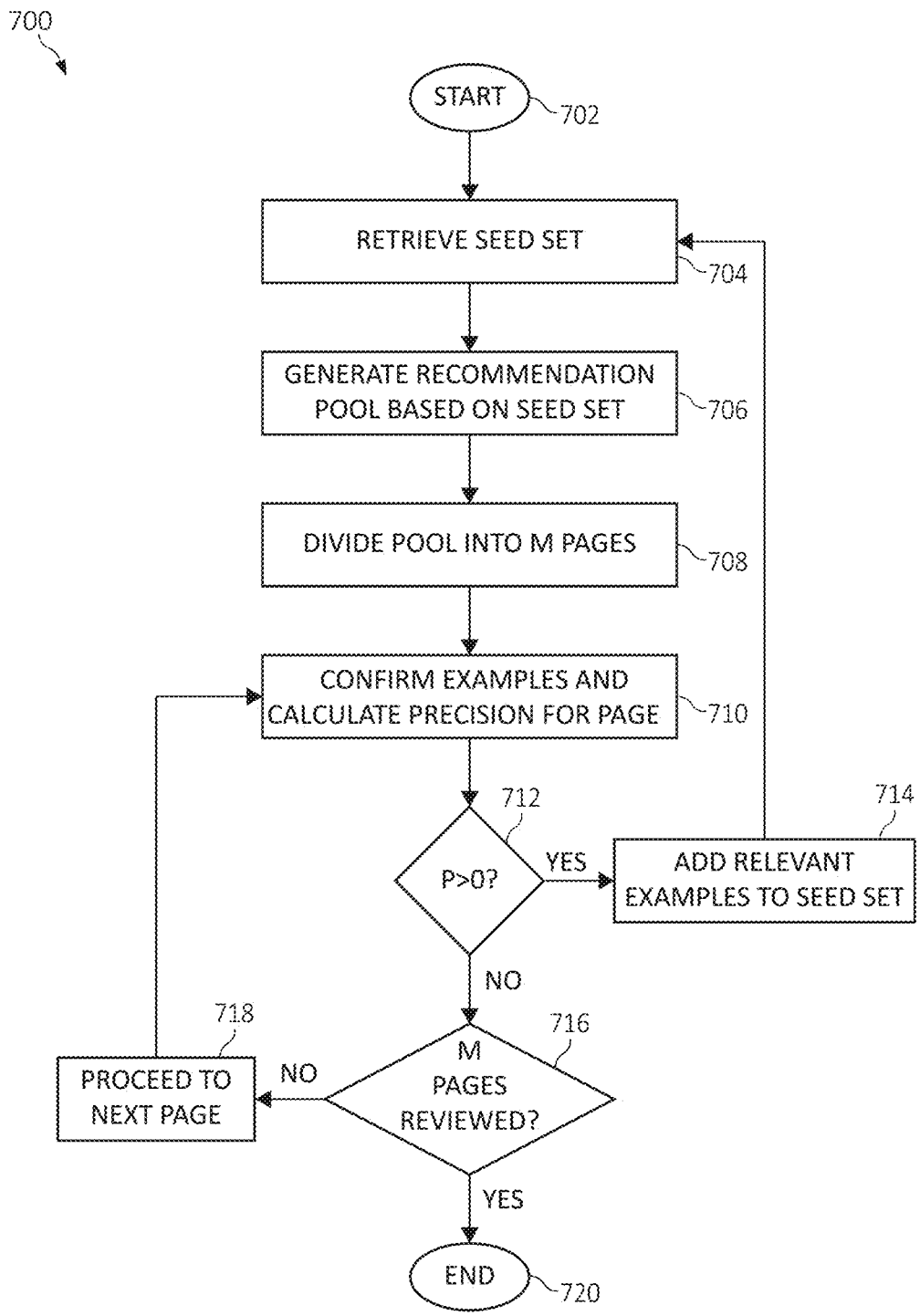
FIG. 7 is a flow chart diagram depicting an iterative intent authoring process, according to embodiments of the present invention.

To provide a bounding constraint to limit both the user's input effort as well as computing resources used to perform the evaluation, at most M pages (e.g., 3 pages having 10 examples each) in each round are presented to the user/automatic driver. FIG. 7 illustrates an iterative evaluation method 700 of this process. The functionality of the method 700 may be executed as instructions on a machine, where the instructions are embodied on a tangible, non-transitory machine-readable storage medium. The method 700 begins at step 702. A seed set of utterances (i.e., at least one utterance relevant to the target intent) is received and/or input by a user (step 704). The seed set is used to generate a pool of recommended example utterances based on the seed set (step 706). The pool is further divided into M pages where the example utterances are arranged on each of the M pages according to their rank (i.e., the highest ranked or scored K examples being most predicted as the most relevant to the target intent are shown in the first page, and so on) (step 708).

A precision is calculated for each page pursuant to determining via confirmation which recommended utterance(s) on the page were correctly identified (where precision (P)=number of recommended and relevant utterances on the page/number of recommended utterances on the page) (step 710). A determination is then made at step 712 as to whether the precision (P) is greater than zero (P>0). If P>0, the relevant examples on the page are added to the seed set of the intent, the subsequent pages are discarded, and the method 700 returns to step 704. If, at step 712, P=0 (i.e., no relevant example was found on the current page), then a determination is made at step 716 as to whether the M pages have been reviewed. If the M pages have been reviewed, the method 700 proceeds to the next page (calling for the next round of recommended examples) (step 718), and returns to step 710. If, at step 716, the M pages have been reviewed, the method 700 ends (step 720).

The stopping condition of the above process in step 720 thus prevents the user from having to go beyond M pages of recommendations in a round. The automatic driver subsequently saves snapshots of the intent state and evaluates each of the snapshots in a separate process that does not interfere with the user action/expansion simulation.

The snapshot evaluator then calculates various figures of merits. Examples are: (1) The accuracy of an intent classifier trained with accumulated training examples in the snapshot and applied to reserved, unseen test data. (2) The linguistic diversity (e.g., a frequency measure of how many unique words or phrases the example utterances used to represent the same intent) of the accumulated training examples as a predictor of their potential ability to match live utterances of the same intent. (3) A data complexity measure that quantifies the extent to which the examples of an intent are separable from the off-intent examples.

In some embodiments, if there is a held-out test set (a subset reserved apart from the seed set and the remaining corpus used for recommendations), this held-out test set can be used to calculate the recall of the classifier trained with accumulated data at each snapshot for a given intent. Several snapshots are of special significance: (1) An initial snapshot. (2) A terminal snapshot when the stopping condition is triggered (i.e., at step 720 of the method 700). (3) A golden snapshot where all relevant utterances from the chat logs 602 are added. The accuracy of the classifier in the terminal snapshot compared to that in the initial snapshot portrays whether or how much improvement is made by expanding the training data. Similarly, the accuracy of the classifier in the golden snapshot compared to that in the terminal snapshot portrays how much more information about the target intent remains in the chat log and is not yet exploited by the recommendation algorithm under the assumption of limited user effort.

Figure 8:
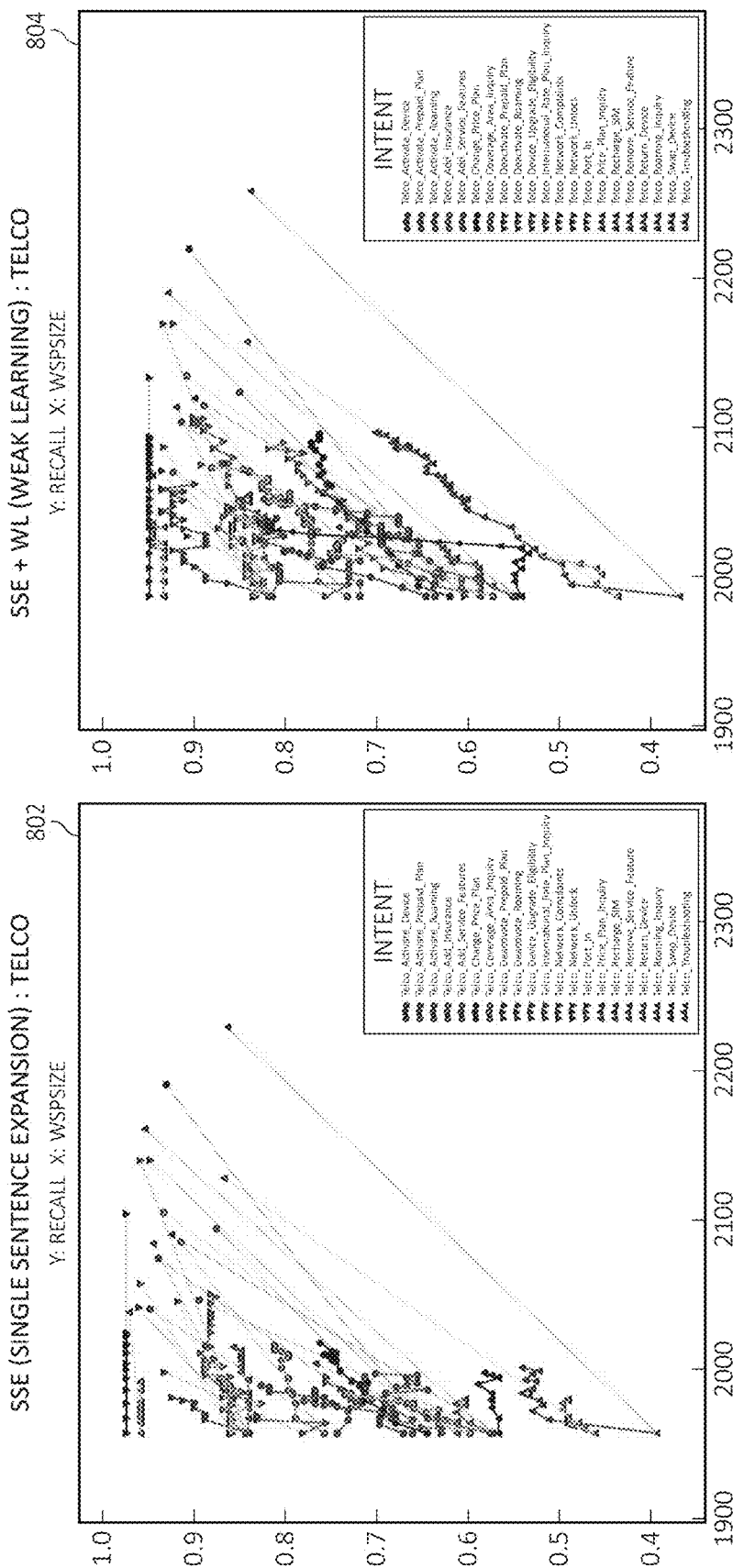
FIG. 8 is a block diagram depicting a diagnostic report and plot tracking the evaluation of the intent authoring processes, according to embodiments of the present invention.

It is also important to evaluate the changes of these figures of merits as a function of user effort that is measured by the number of recommended examples for the user to review and confirm. Assuming certain limits in the simulated user session, such as the number of pages a user is willing to review, the maximum reachable classifier accuracy or sample diversity and separability may be computed. The snapshot evaluator uses this information to generate diagnostic reports and plots that can be used to track the performance of the recommendation algorithms, as depicted in the graphical plot 800 of FIG. 8. Plot 800 depicts the comparison of an SSE graph 802 to an SSE+WL graph 804, where the x-axis represents the size (number of utterances) of the test set and the y-axis represents the recall rate of a classifier trained with each snapshot up to the end (stopping point) of expansion plus the golden snapshot. Graphs, plots, reports, and other figures of merits such as these may be compared to one another for each given algorithm used to produce the recommended sentences for training the classifier to determine, according to various factors, which of the algorithms (and parameters set thereof) would be best used for a given test set, implementation, and/or target intent. The resultant algorithm may then deployed to recommend examples to the user to train classifiers according to the desired user/client requirements or needs.

An ideal recommendation algorithm can retrieve the relevant utterances early in the process, and with higher ranks in each iteration, so that these examples can be selected by the user with minimum review effort. The algorithm also should be able to recommend enough relevant utterances to fully capture the intent's scope before the process terminates (i.e., produce a classifier with accuracy evaluated in the terminal snapshot which closely matches that of the golden classifier of the golden snapshot). The merits of different recommendation algorithms can be compared by their accuracies in the terminal snapshot which show their maximum reach, or by the accuracies of the snapshots generated when the process stops at the same, fixed number of pages for the user to review.

When a held-out test set is not available, alternative figures of merits may be used, such as the diversity of the utterances measured by the counts of unique words in each snapshot. A good recommendation algorithm can produce snapshots with rich diversity early in the process, and closely match that of the golden snapshot. Another figure of merit to use may be a data complexity measure that characterizes the separability of the utterances in the target intent from the off-intent utterances. The measure is computed as follows. A vector space is chosen with a metric in which all the utterances from a snapshot are represented. A minimum spanning tree (MST) is computed that connects all the utterances regardless of their being in-intent or off-intent, and the number of edges are counted in the MST that connect an in-intent utterance to an off-intent utterance. The ratio of such a count to the total number of edges in the MST can serve as a figure of merit to compare different snapshots and recommendation algorithms. A good snapshot produced by the recommendations and selections should have a ratio which closely matches the value attained by the golden snapshot.

It should be noted that, as it pertains to the present invention, any machine learning/deep learning model and/or algorithm may be employed in context with the functionality described herein. In one aspect, the machine learning based models may be performed using a wide variety of methods or combinations of methods, such as supervised learning, unsupervised learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, and fuzzy clustering. Specific details regarding any of the examples of supervised, unsupervised, reinforcement learning, or other machine learning described in this paragraph are known and are considered to be within the scope of this disclosure.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for evaluating intent authoring processes, by a processor, comprising:
   receiving a dataset comprising utterances of interactive dialog sessions between agents and clients for a given product or service;
   performing a classification of at least a portion of the utterances for a target intent according to at least one of a plurality of recommendation algorithms by an automatic driver; wherein the automatic driver invokes the at least one of the plurality of recommendation algorithms and simulates a manual confirmation of decisions generated by the one of the plurality of recommendation algorithms which would otherwise be performed by a user;
   automatically evaluating the classification of the utterances made by the automatic driver according to the at least one of the plurality of recommendation algorithms; and
   generating a report tracking the evaluated classification for each of the at least one of the plurality of recommendation algorithms.

2. The method of claim 1, wherein the dataset contains a plurality of the utterances having previously been labeled with respective intents.

3. The method of claim 1 wherein the dataset is separated into at least a first subset of utterances chosen to represent seed examples for the target intent and a second subset of utterances representing a remaining corpus of the dataset.

4. The method of claim 3, wherein the first subset of utterances is used to initiate the classification of the second subset of utterances; and wherein knowledge of the previously labeled respective intents is withheld from the automatic driver.

5. The method of claim 1, further including iterating, by the automatic driver, through expanded recommendations of the utterances when performing the classification until a bounding constraint is satisfied.

6. The method of claim 5, further including, when performing the classification, accepting into the target intent those of the expanded recommendations of the utterances whose previously labeled respective intent matches the target intent.

7. The method of claim 1, wherein the report includes figures of merits for respective ones of the plurality of recommendation algorithms, the figures of merits selected from a group consisting of a classifier accuracy, a linguistic diversity, and a data complexity measure of separable intent to off-intent utterances.

8. A system for evaluating intent authoring processes, comprising:
   a processor executing instructions stored in a memory device; wherein the processor:
      receives a dataset comprising utterances of interactive dialog sessions between agents and clients for a given product or service;
      performs a classification of at least a portion of the utterances for a target intent according to at least one of a plurality of recommendation algorithms by an automatic driver; wherein the automatic driver invokes the at least one of the plurality of recommendation algorithms and simulates a manual confirmation of decisions generated by the one of the plurality of recommendation algorithms which would otherwise be performed by a user;
      automatically evaluates the classification of the utterances made by the automatic driver according to the at least one of the plurality of recommendation algorithms; and
      generates a report tracking the evaluated classification for each of the at least one of the plurality of recommendation algorithms.

9. The system of claim 8, wherein the dataset contains a plurality of the utterances having previously been labeled with respective intents.

10. The system of claim 8, wherein the dataset is separated into at least a first subset of utterances chosen to represent seed examples for the target intent and a second subset of utterances representing a remaining corpus of the dataset.

11. The system of claim 10, wherein the first subset of utterances is used to initiate the classification of the second subset of utterances; and wherein knowledge of the previously labeled respective intents is withheld from the automatic driver.

12. The system of claim 8, wherein the processor iterates, using the automatic driver, through expanded recommendations of the utterances when performing the classification until a bounding constraint is satisfied.

13. The system of claim 12, wherein the processor, when performing the classification, accepts into the target intent those of the expanded recommendations of the utterances whose previously labeled respective intent matches the target intent.

14. The system of claim 8, wherein the report includes figures of merits for respective ones of the plurality of recommendation algorithms, the figures of merits selected from a group consisting of a classifier accuracy, a linguistic diversity, and a data complexity measure of separable intent to off-intent utterances.

15. A computer program product for evaluating intent authoring processes, the computer program product comprising a non-transitory computer-readable storage medium having computer-readable program code portions stored therein, the computer-readable program code portions comprising:
   an executable portion that receives a dataset comprising utterances of interactive dialog sessions between agents and clients for a given product or service;
   an executable portion that performs a classification of at least a portion of the utterances for a target intent according to at least one of a plurality of recommendation algorithms by an automatic driver; wherein the automatic driver invokes the at least one of the plurality of recommendation algorithms and simulates a manual confirmation of decisions generated by the one of the plurality of recommendation algorithms which would otherwise be performed by a user;

an executable portion that automatically evaluates the classification of the utterances made by the automatic driver according to the at least one of the plurality of recommendation algorithms; and an executable portion that generates a report tracking the evaluated classification for each of the at least one of the plurality of recommendation algorithms.

16. The computer program product of claim 15, wherein the dataset contains a plurality of the utterances having previously been labeled with respective intents.

17. The computer program product of claim 15, wherein the dataset is separated into at least a first subset of utterances chosen to represent seed examples for the target intent and a second subset of utterances representing a remaining corpus of the dataset.

18. The computer program product of claim 17, wherein the first subset of utterances is used to initiate the classification of the second subset of utterances; and wherein knowledge of the previously labeled respective intents is withheld from the automatic driver.

19. The computer program product of claim 15, further including an executable portion that iterates, using the automatic driver, through expanded recommendations of the utterances when performing the classification until a bounding constraint is satisfied.

20. The computer program product of claim 19, further including an executable portion that, when performing the classification, accepts into the target intent those of the expanded recommendations of the utterances whose previously labeled respective intent matches the target intent.

21. The computer program product of claim 15, wherein the report includes figures of merits for respective ones of the plurality of recommendation algorithms, the figures of merits selected from a group consisting of a classifier accuracy, a linguistic diversity, and a data complexity measure of separable intent to off-intent utterances.

* * * * *